US005647079A

United States Patent [19]

Hakamiun et al.

[11] Patent Number: 5,647,079

[45] Date of Patent: Jul. 15, 1997

[54] INFLATABLE PATIENT SUPPORT SURFACE SYSTEM

[75] Inventors: Reza Hakamiun; Craig D. Ellis, both of Charleston; Benjamin Salvatini, Summerville; John A. Brenner, Ladson; David N. Ashcraft, Mt. Pleasant; Kenith W. Chambers; Stephen E. Glover, both of Charleston, all of S.C.

[73] Assignee: Hill-Rom, Inc., Ind.

[21] Appl. No.: 618,757

[22] Filed: Mar. 20, 1996

[51] Int. Cl.[6] .................... A61C 7/04

[52] U.S. Cl. .................... 5/713; 5/714; 5/914; 5/723; 285/124.3

[58] Field of Search .................... 5/710, 711, 713, 5/714, 722, 723, 724, 728, 914, 715; 285/137.1, 131

[56] References Cited

U.S. PATENT DOCUMENTS

| | | | |
|---|---|---|---|
| 1,772,310 | 8/1930 | Hart . | |
| 3,477,071 | 11/1969 | Emerson | 5/61 |
| 3,485,240 | 12/1969 | Fountain | 128/33 |
| 3,492,988 | 2/1970 | De Mare | 128/33 |
| 3,590,855 | 7/1971 | Woollen | 285/137.1 X |
| 3,747,632 | 7/1973 | Kok et al. | 235/137.1 X |
| 3,775,781 | 12/1973 | Bruno et al. | 5/61 |
| 4,225,989 | 10/1980 | Corbett et al. | 5/453 |
| 4,488,322 | 12/1984 | Hunt et al. | 5/453 |
| 4,493,340 | 1/1985 | Weirich | 285/137.1 X |
| 4,534,584 | 8/1985 | Weirich et al. | 285/137.1 X |
| 4,553,573 | 11/1985 | McGarrah | 285/137.1 |
| 4,622,706 | 11/1986 | Takeuchi | 5/453 |
| 4,630,847 | 12/1986 | Blenkush | 285/29 |
| 4,794,937 | 1/1989 | Hofmann | 137/614.05 |
| 4,834,825 | 5/1989 | Adams et al. | 156/294 |

(List continued on next page.)

FOREIGN PATENT DOCUMENTS

WO95/21599 8/1995 WIPO .

OTHER PUBLICATIONS

Basham et al., "Continuous Lateral Rotational Therapy: When Is It Right for Your Patient," *American Journal of Nursing (Supplement)*, pp. 3–14, Jun., 1995.

Cardio Systems, brochure entitled "PNEU–CARE™ Plus–Kinetic Seris, Air Support Therapy Mattress Replacement".

Hill–Rom, specification brochure entitled "A Hill–Rom Solution, Acucair Continuous Airflow System," 1995.

Invacare, brochure entitled "Microair® Turn–Q™ Automatic Turning Mattress *With Low Air Loss,*"Form No. 93–120 Rev. 082694, 1993.

KCI, brochure entitled "It's Good to be Home," #24–A–107, describing HomeKair™ Bed, May, 1993.

KCI, brochure entitled "$Q_2$Plus™ Pre or Post–Care to Kinetic Therapy . . . ," #31A–102, Jun., 1993.

KCI, brochure entitled "Designed By Critical Care Physicians And Nurses With The Patient In Mind," #1–A–033, describing TriaDyne™, The Critical Care Healing System, May, 1995.

KCI, brochure entitled "Home Kair D.M.S.™ Dynamic Mattress System," #24–A–108, describing The Dynamic Mattres System, Aug., 1993.

Lumex, brochure entitled "Akrotech 4000," #AK200, describing low air loss therapy bed system, Aug., 1994.

Lumex, brochure entitled "Akrotech® 4000T," #AK227, describing AkroTech™ 4000T Low Air Los Turning System, Oct., 1994.

(List continued on next page.)

*Primary Examiner*—Michael F. Trettel

*Attorney, Agent, or Firm*—Arnold, White & Durkee

[57] ABSTRACT

A patient air mattress replacement system having a pair of air support layers with a hose assembly containing a plurality of supply tubes for providing air to the air support layers. The mattress includes an interface connection which connects the support layers to the hose assembly and valve fittings which prevent escape of air from at least one support layer when the hose assembly is disconnected from the interface connection.

12 Claims, 12 Drawing Sheets

U.S. PATENT DOCUMENTS

| | | | |
|---|---|---|---|
| 4,941,221 | 7/1990 | Kanzler | 5/60 |
| 4,949,413 | 8/1990 | Goodwin | 5/453 |
| 4,953,247 | 9/1990 | Hasty | 5/453 |
| 4,982,736 | 1/1991 | Schneider | 285/137.1 X |
| 5,003,654 | 4/1991 | Vrzalik | 4/453 |
| 5,022,110 | 6/1991 | Stroh | 5/455 |
| 5,090,077 | 2/1992 | Caden et al. | 5/456 |
| 5,092,007 | 3/1992 | Hasty | 5/453 |
| 5,168,589 | 12/1992 | Stroh et al. | 5/455 |
| 5,219,185 | 6/1993 | Oddemino | 285/137.1 X |
| 5,235,713 | 8/1993 | Guthrie et al. | 5/453 |
| 5,243,721 | 9/1993 | Teasdale | 5/453 |
| 5,249,318 | 10/1993 | Loadsman | 5/453 |
| 5,251,349 | 10/1993 | Thomas et al. | 5/453 |
| 5,267,364 | 12/1993 | Volk | 5/453 |
| 5,388,292 | 2/1995 | Stinson et al. | 5/711 X |
| 5,479,119 | 12/1995 | Dye | 285/137.1 X |
| 5,487,196 | 1/1996 | Wilkinson et al. | 5/710 X |

OTHER PUBLICATIONS

SCD Industries, Inc., brochure entitled "The Future In Lateral Rotation Therapy Has Just Arrived . . . RT2000," (undated).

Support Systems International, Inc., brochure entitled "Therapy without compromise. *Flexicair II* Low Airloss Therapy," #A001, Mar., 1988.

INFLATABLE PATIENT SUPPORT SURFACE SYSTEM

BACKGROUND OF THE INVENTION

The present invention relates generally to an apparatus for supporting a patient; and more particularly relates to an air mattress replacement system for use upon a bedframe to provide comfort and/or therapeutic support to a bedridden patient.

It is well known to use either an air-fluidized or low air loss bed to provide comfort and therapy to individuals who are bedridden for long periods of time and unable to move themselves. See, e.g., U.S. Pat. No. 4,483,029 issued Nov. 20, 1984 to Paul (use of air-fluidized bed) and U.S. Pat. No. 4,949,413 issued Aug. 21, 1990 to Goodwin (use of low air loss bed). Generally, a patient supported upon an air-fluidized bed is positioned so as to "float" upon the cushion created when air is continuously directed upward through a layer of silicone beads or other fluidizable material positioned beneath the patient. Air fluidized therapy is particularly suited for use in the treatment of patients who suffer from severe burns or the most severe bedsores. Low air loss therapy, on the other hand, has been demonstrated to reduce the occurrence of pressure ulcers caused by the loss of capillary circulation, and has been shown to be a most effective aid in the treatment of bedsores. Low air loss therapy helps maintain a patient's peripheral circulation by distributing the patient's weight over multiple cushions filled with air. The even distribution of pressure on the skin tends to limit capillary closure, thereby helping maintain tissue viability around bony prominences such as the sacrum and the heels. Independent movement of the surface of the low air loss cushions with respect to one another helps to decrease shear on a patient's skin. The fabric itself used in the cushions forming the sleep surface may be selected so as to also help decrease friction between the patient and the bed. In addition, because the fabric may be air permeable, air that escapes from the cushions typically is able to flow beneath and around the patient, which helps promote drying of the patient's skin.

One commercially available low air loss bed is the FLEXICAIR Low Air Loss Therapy unit, available from the Hill-Rom Company, Batesville, Ind. The FLEXICAIR bed is a five-zone, 21-cushion low airloss surface built upon a Hill-Rom Century Series hospital bed frame. It is a static low air loss product, meaning that once the air zones are adjusted to a patient's particular height and weight, the pressures within the bags of that bed are maintained fairly constant during use absent some further readjustment, and some air is allowed to escape from one or more bags during use, either through small perforations in the bags, or through the bag fabric itself while an air source continuously replaces such air and maintains a fairly constant pressure.

Recent advances in low air loss bed technology, however, have led to the introduction of more advanced products such as the EFFICA bed, also commercially available from the Hill-Rom Company. The EFFICA bed combines the effectiveness of a static low air loss bed with the additional patient therapy modes of turning, percussion and vibration.

Historically, there has been an ongoing search by care providers for effective, low cost therapeutic devices that has led them away from the use of foam mattresses, pads and bubble mats, and toward low air loss beds, mattress replacements, and overlays. Further, although both the FLEXICAIR and the EFFICA beds have been met with acceptance by doctors, nurses, and other healthcare providers, a seemingly never ending search by caregivers for effective therapies at lower costs has led to additional requests for an advanced frameless technology. Hospitals and clinics in particular have led the way toward use of mattress replacements and overlays by looking for a way to utilize bed flames they already own in conjunction with the latest, most effective air mattress technology available.

The primary difference between a mattress replacement and an overlay is that an overlay is typically used on top of an existing bed frame and mattress, while a mattress replacement is used in conjunction with a bed frame as a substitute for an existing mattress. One commercially available air mattress system is the ACCUCAIR Low Air Loss overlay unit available from the Hill-Rom Company, Batesville, Ind.

SUMMARY OF THE INVENTION

The present invention is particularly suited to addressing the needs of hospitals and clinics for an easy to use, cost effective, air mattress replacement system. As explained in more detail below, the present invention overcomes the shortcomings of prior air mattress replacement and overlay products. Although the present invention is described below in terms of the preferred mattress replacement embodiments, one of ordinary skill in the art will recognize that the present invention is not necessarily so limited. It is for simplicity of expression that the invention is described in terms of the preferred mattress replacement embodiments. Thus, it should be understood that a number of other embodiments of that which is disclosed herein are equally within the scope of the present invention. Further, in terms of effectiveness in treatment, it should be understood that the present invention comprises only one tool to help caregivers provide quality care to patients. An overall treatment protocol most likely will include one or more of the following: a turning schedule; nutritional assessment and intervention; managing incontinence; keeping the fowler bed position to less than a 45 degree angle; etc.

The present invention as described herein in a first preferred embodiment generally comprises a mattress replacement apparatus for supporting a patient in a static mode. As compared to a low air loss bed, the blower, controller and valves used to inflate and to maintain the pressure within the cushions of the mattress are located in an air supply unit similar to the unit now available on the commercially available ACCUCAIR unit rather than integrated under a bed frame. The air supply unit hangs on the footboard of a bed, or can sit on the floor near the bed.

The mattress replacement may be used on a number of different types of bedframes. The mattress portion is secured to the bedframe by means of a plurality of straps or other appropriate fastening means. The overall height of the static mode mattress is approximately eight inches. Twenty six-inch upper cushion segments are attached to or otherwise positioned above a lower air cushion substrate. Velcro or snap side panels preferably are used as a fastening device to join the upper cushions with the substrate and provide added stability to the assembly. Of course other suitable fastening means also may be used.

The twenty six-inch cushion segments comprising the upper cushioning level preferably are made of tightly woven twill nylon, and are coated with polyurethane on the side of the fabric that does not contact the patient. The cushion segments may be arranged in five independent pressure zones: Zone 1 comprises four cushion segments which support the patient's head and neck region; Zone 2 comprises three cushion segments which support the patient's chest and back; Zone 3 comprises four cushion segments which support the patient's seat and lumbar; Zone 4 comprises four cushion segments that support the patient's thighs; and Zone 5 comprises five cushion segments which support the patient's calves and heels.

The lower substrate or submattress comprising the lower cushioning level is also preferably constructed of tightly woven nylon twill coated with polyurethane. However, the bottom of the substrate preferably is coated on both sides with weldable polyurethane to protect the mattress from the bed frame. An air hose assembly, described in more detail below, preferably releasably attaches to the air supply unit from the left foot end of the mattress.

The air supply unit is preprogrammable according to a patient's height and weight for optimum pressure relief in each of the zones of the mattress. A manual adjustment override of a total of plus or minus fifteen percent, in seven and one half percent increments in each zone, allows each zone to be customized to a particular patient's needs. A CPR feature provides for rapid deflation of the mattress in an emergency in approximately thirty seconds. A maximum inflation feature provides for a uniformly firm surface from all cushions for transferring the patient from the mattress assembly to a stretcher or to another bed. A seat deflate feature also is available to deflate zones three and four of the mattress only. The seat deflate feature allows nurses or other caregivers to bedpan patients, and helps the patients to get out of bed more easily.

The controls of the air supply unit are connected to a controller assembly having a microprocessor control board. The microprocessor monitors the control panel and the air compensating chamber temperature. The microprocessor also controls the blower motor and the valves that maintain the desired pressure in each of the zones of the mattress replacement assembly. While some of the earlier low air loss beds simply employed valves controlled directly by voltage to the valve with no feedback loop, the apparatus of the present invention preferably utilizes proportional valves. A proportional valve is a stand alone valve that adjusts to a set pressure and will match the output pressure with a signal received from the microprocessor controller.

The air supply system generally takes ambient air, pressurizes it, and sends it through the hose assembly to the mattress. More specifically, an air compensating chamber takes air from the blower and sends it to the pressure control valves for each zone and for the substrate. After the air passes through the valves, the air exits in independent air streams through an outlet manifold, and through an air hose assembly to the mattress. The air hose assembly comprises a bundle of individual air supply hoses or tubes which permit fluid communication between the air supply unit and the mattress assembly. An interface coupling assembly forms each end of the hose assembly which is releasably connected to an interface connection assembly connected to the mattress. A similar connection assembly may be incorporated into the air supply unit. The interface connector may include one way valves for each supply tube which prevents the escape of air through the connector when the hose assembly is disconnected from the mattress.

In a second preferred embodiment, the mattress replacement apparatus of the present invention comprises a system for supporting a patient as desired in either a static mode or a turning mode. In this second preferred embodiment the present invention generally comprises a two level mattress system including a pair of lower level air chambers arrangement in combination with an upper level cushion assembly, actuable for rotating a patient from side to side as desired. From an overall treatment standpoint, the second preferred embodiment has a clear advantage over the first preferred (static mode only) embodiment, in that the need for manual turning of the patient is greatly reduced. Any turning required by the overall treatment protocol for the patient can be accomplished almost automatically by the mattress replacement unit itself.

A number of broad aspects of the second preferred embodiment generally resemble features of the first preferred embodiment described herein. However, the second preferred embodiment differs in certain respects, in part to allow for the turning of patients. For example, the mattress replacement system again generally comprises an upper cushioning layer and a lower substrate. However, the upper cushion assembly of the second embodiment may include only four independent pressure zones: Zone 1 comprises a single air sack which supports the patient's head and neck region; Zone 2 comprises a single air sack which supports the patient's chest and back; Zone 3 comprises a single air sack which supports the patient's lumbar, seat, and thighs; and Zone 4 comprises a single air sack which supports a patient's lower calves and feet.

Each of the air sacks of Zones 1–4 of the second embodiment preferably comprises a single air chamber having a plurality of internal webs running across a portion of the air sack, perpendicular to the longitudinal axis of the bed. Although each upper layer air chamber may be a separately inflatable low air loss cushion to provide support to the patient with optimum pressure relief, preferably the pressure in each zone will be maintained substantially constant, and there will be no loss of air from the cushions. Again, the pressures in each upper level air chamber are maintained as a result of preprogramming the air supply unit with the patient's height and weight, and by further adjusting the resulting standard or default pressures for the patient by a manual override.

The lower level air chamber arrangement of the second preferred embodiment comprises a substrate which includes at least three separately inflatable air sacks. The first lower level air sack is a single inflatable air bag aligned with the patient's head region and preferably supporting at least Zone 1 of the upper cushion assembly. The second and third lower level air sacks are each independently inflatable air bags which together preferably support at least Zones 2–4 of the upper cushion assembly.

The first lower level air sack comprises a rectangularly shaped air bag having a plurality of internal webs running across a portion of the bag, perpendicular to the longitudinal axis of the bed. When the mattress replacement system of the present invention is operated either in the static mode or the turning mode, the first lower level air sack preferably is maintained at a substantially constant pressure during use, wherein the level of support provided by the first lower level air sack is at least adequate to support the head and neck of the patient in the event that Zone 1 of the upper cushion assembly completely deflates. The pressure in the first lower level air sack preferably is maintained substantially constant at all times, because from a general medical standpoint, it typically is advisable that the head and neck of a patient have sufficient support and not be turned with the other portions of the patient's body.

The second and third lower level air sacks preferably comprise elongated rectangular air bags positioned side-by-side, preferably adjacently, along at least a portion of the longitudinal axis of the bed, beneath at least a portion of each of Zones 2–4 of the upper cushion assembly. Like the first lower level air sack, the second and third lower level air sacks preferably include a plurality of internal webs running across portions of the sacks, perpendicular to their longitudinal axes.

When the second embodiment of the mattress replacement system of the present invention is operated in the static mode, the second and third lower level air sacks preferably are maintained independently at substantially constant and equal pressures, so that together the two air sacks at least would provide support for the patient in the event that the air bags of one or more of Zone 2–4 of the upper cushioning level deflated entirely thereby preventing the patient from "bottoming out" and resting directly on the bed frame. However, the second and third lower level air sacks preferably also are separately inflatable and deflatable, and may be inflated and deflated independently of each other, so as to permit use in a second, patient turning mode. In other words, in the turning mode deflating one sack causes the patient to rotate and to turn toward one side of the bed, while deflating the other sack would cause the patient to rotate and to turn towards the other side of the bed. Of course, it may not be necessary to entirely deflate one of the lower level air sacks to accomplish the rotation and turning of a patient to one side. Of primary importance is that bottoming out of the patient be avoided. Thus, in accordance with the present invention, turning a patient to one side preferably is accomplished by the combination of lowering the pressure in one lower level air sack to about one inch water pressure and hyperinflating the other air sack by up to two inches water pressure. Then, by alternately inflating and deflating the second and third lower level air sacks in this manner, i.e. repetitively raising and lowering the pressures in each of the air sacks alternatively to turn the patient to one side and then the other over time, a patient positioned upon the mattress replacement system of the present invention can be continuously turned or rotated from side to side as desired.

Examples of the more important features of this invention have been broadly outlined above in order that the following detailed description may be better understood and so that the contributions which this invention provides to the art may be better appreciated. There are, of course, additional features of the invention which will be described herein and will be included within the subject matter of the claims appended hereto.

DETAILED DESCRIPTION OF THE INVENTION

Figure 1:
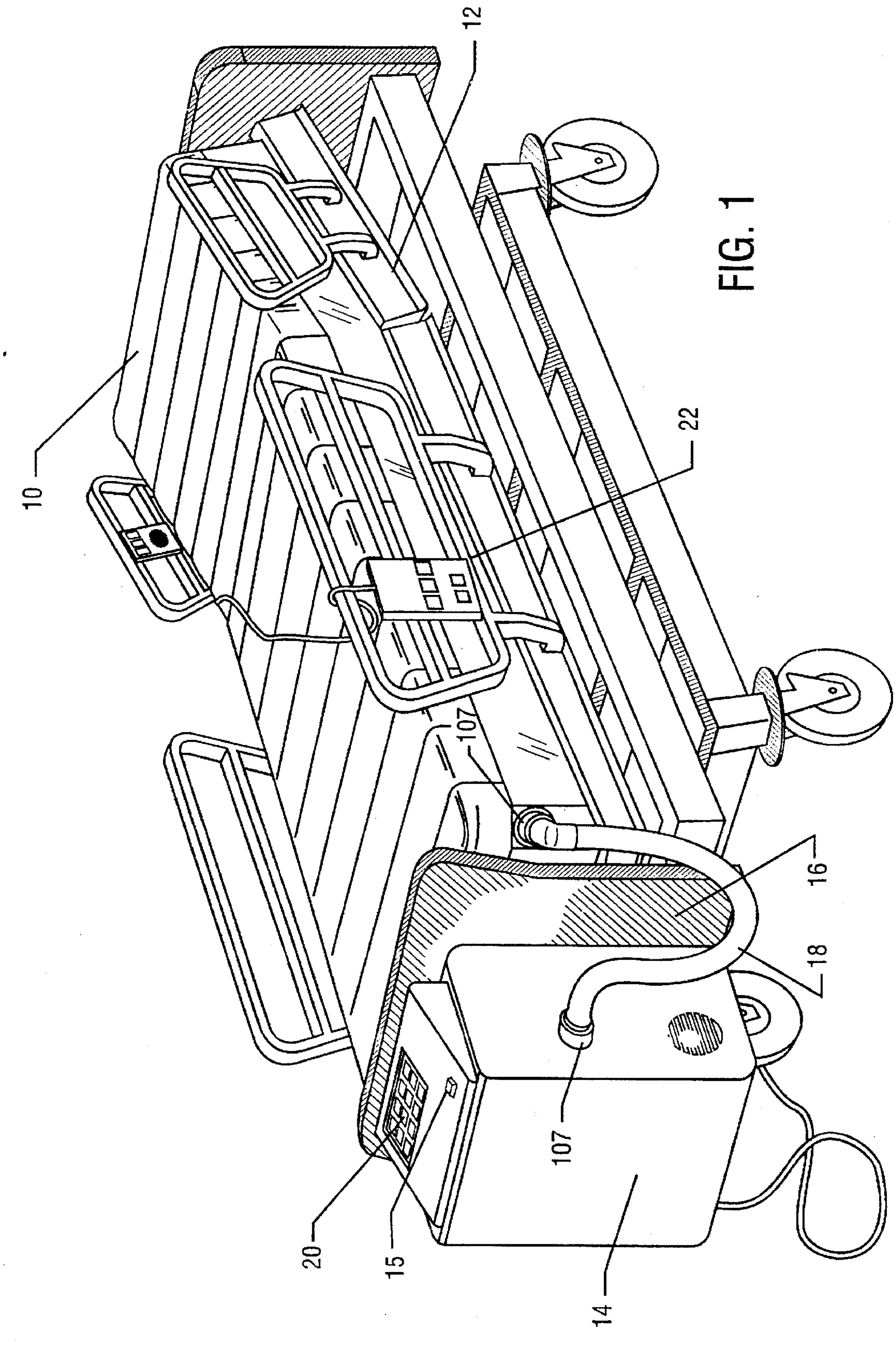
FIG. 1 is an illustration of an exemplary mattress replacement apparatus in accordance with the present invention, shown positioned upon a bedframe.

FIG. 1 is an illustration of a preferred mattress replacement system in accordance with the present invention. A mattress assembly 10 is shown positioned upon a bed frame 12 in place of the standard patient mattress. An air source or supply unit 14, shown hanging from the footboard 16 of bedframe 12, is operatively coupled to the mattress 10 by an air hose assembly 18. A control panel 20 located on top of the air supply unit 14 is easily accessible by caregivers. The control panel 20 displays information concerning the operation of the mattress replacement assembly and is the point from which the various features of the mattress replacement system are controlled by the caregiver. The mattress replacement system also may be equipped with an air supply unit remote control unit 22 which would permit a patient lying in the bed to control certain desired aspects of the system's operation.

As noted above, there are two generally preferred embodiments of the system represented generally in FIG. 1. In the first preferred embodiment, FIG. 2, the mattress 10 comprises upper and lower cushion levels. The upper cushion level 22 provides a support surface upon which the patient lays and which includes five groups or zones running from the head to the foot of the bed (labeled A–E in FIG. 2). Each upper level zone may be formed by a single cushion 36 which may be constructed from a plurality of generally rectangularly-shaped air bag segments 38 which are in fluid communication with each other within a single cushion 36. Each segment 38 may have one or more internal baffles or webs which separate each segment into a plurality of internal chambers 40, 42. However, due to the existence of passageways (not shown) around or through each such baffle, if one air bag segment chamber within a zone becomes punctured and deflates, the entire cushion 36 deflates too.

A representative air cushion 36 of zones 1–5 of this first embodiment is shown in greater detail in FIGS. *3a–3b*, respectively. As shown in the drawing, the air bag segments 38 in each cushion 36 include an upper chamber 40 and a lower chamber 42. The upper chamber 40 of each bag segment is generally depicted in the drawings as having a shape like a rounded square or rectangular log running perpendicular to the longitudinal axis of the bed across its width, although their exact shape may be for example, round or ovoid, and may vary depending upon the application. The lower chambers 42 have sides that come together at side seam 41 at the ends of each lower chamber 42. In FIG. *3a* the lower chambers 42 have a more rounded appearance than the upper chambers 40. However, their exact shape may vary too. The lower chambers 42 run transverse to the longitudinal axis of the bed, but in the preferred embodiment only across a portion of its width.

Each air bag segment upper chamber 40 is in fluid communication with the air bag segment lower chamber 42 immediately beneath it. Fluid communication may be achieved through grommets or other passages in the membrane wall 44 at the boundary between the upper and lower chambers. Preferably, however, the membrane wall 44 does not run across the entire boundary between the upper and lower chambers, so that air may pass between chambers around the ends of the membrane wall 44. As can be understood, chamber 40, 42 may be replaced with a single chamber structure which might require internal shape retaining members such as straps to retain the desired chamber shape when inflated.

Within a zone, the longitudinal sides of individual air bag segments 38 run perpendicular to the longitudinal axis of the bed and are generally disposed either close to or adjacent one another along the length of the bed when the air bag segments are inflated. A zone base sheet 46 made of two layers of weldable polyurethane preferably forms the bottoms of the lower chambers 42 of the air bag segments 38 and thus couples the individual air bag segments 38 to one another in a cushion 36 at their lower ends. Each bag segment 38, though, generally is free to move independently of neighboring bag segments so as to reduce shear on the patient's skin. Thus, in the preferred embodiment separate air bag segments 38 within a zone do not share common sides, baffles, or webs but only the base sheet 46. An air passageway (not shown), preferably formed between the two polyurethane layers which form base sheet 46 from the partial joining of the layers themselves, and running preferably along the base sheet at or near the ends of the air bag segments' lower chambers 42, provides for the fluid communication between air bag segments 38.

The base sheet 46 for each cushion 38 is equipped with strips of velcro 48 on its sides to permit adjacent cushions 36 to be joined together to form a patient sleep surface. This joining gives the upper cushioning level greater overall stability by impeding the movement of the cushions 36 with respect to the lower cushioning level and with respect to each other.

Figure 2:
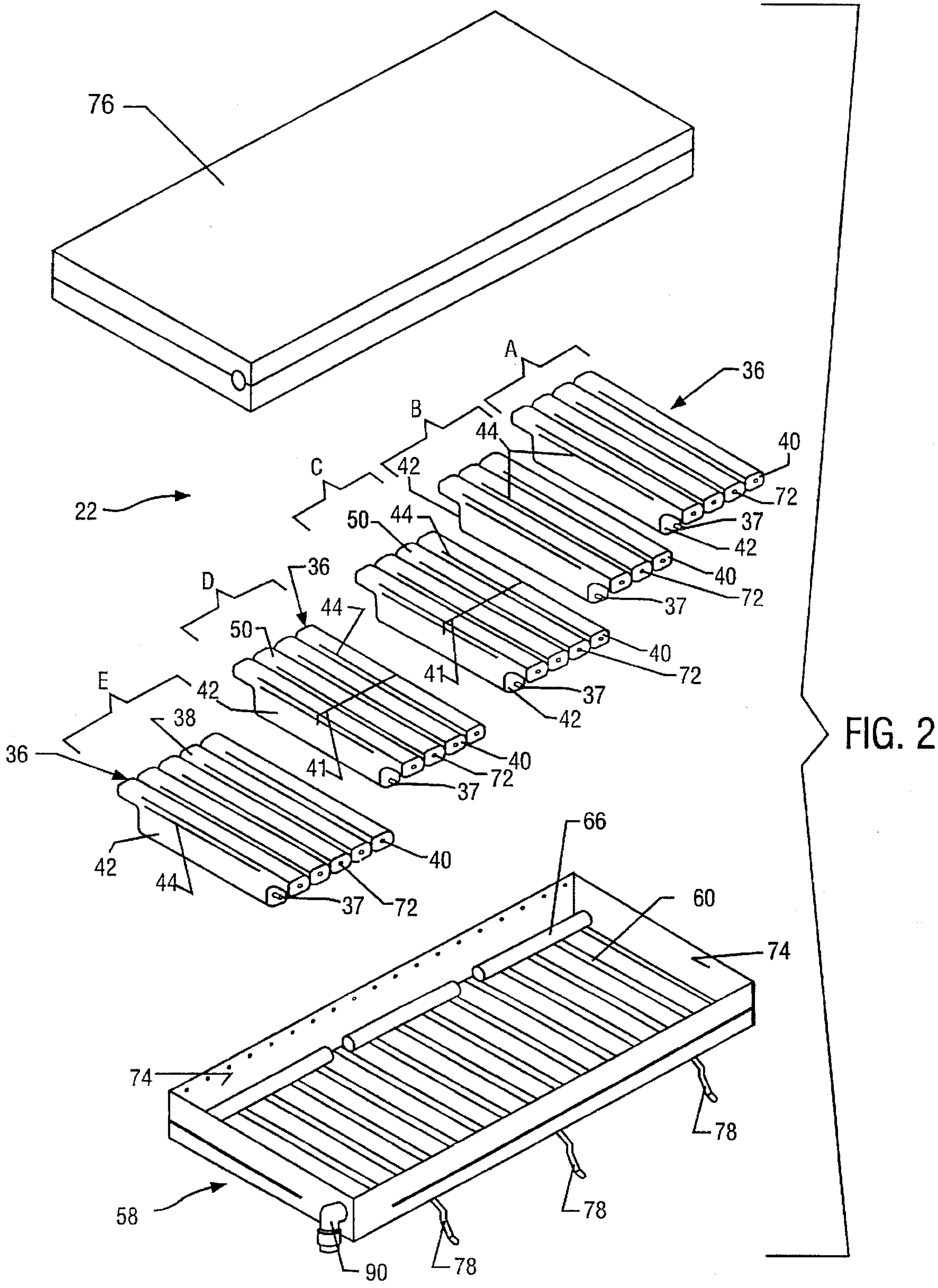
FIG. 2 is an illustration of an exemplary mattress assembly and coverlet in accordance with a static-mode-only embodiment of the present invention, shown in an exploded view.
Figure 3A:
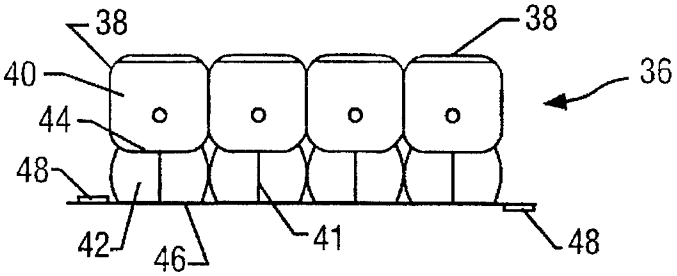
FIGS. 3*a*–3*b* are illustrations of an exemplary cushion, shown as including a plurality of cushion segments, of an exemplary upper cushion level of the mattress assembly shown in FIG. 2, depicted in top and end views
Figure 3B:
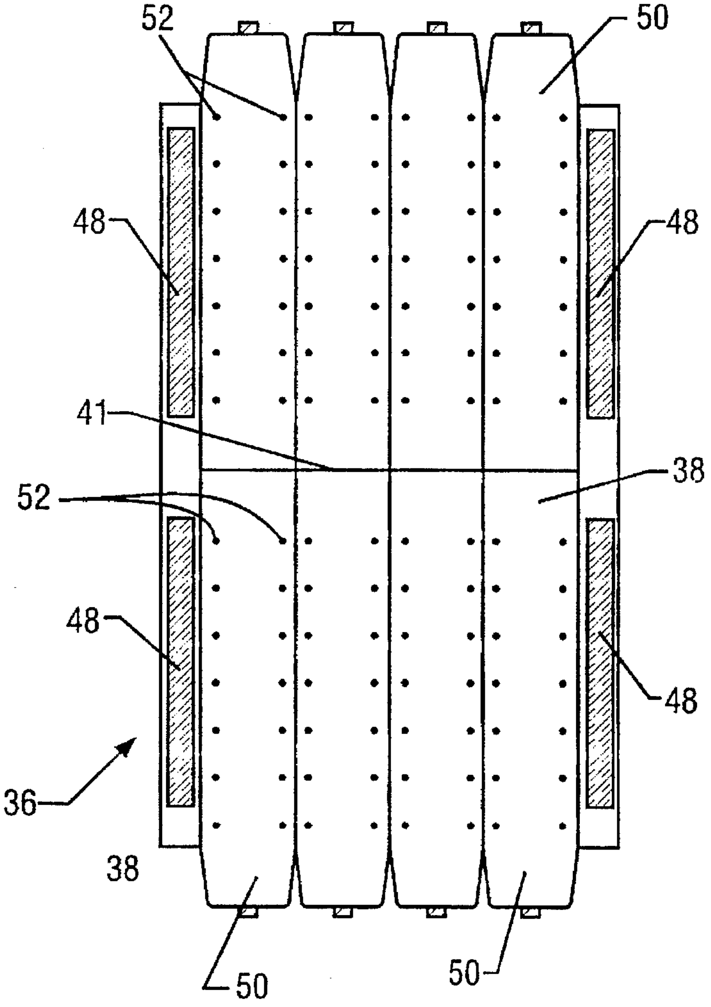
Figure 4:
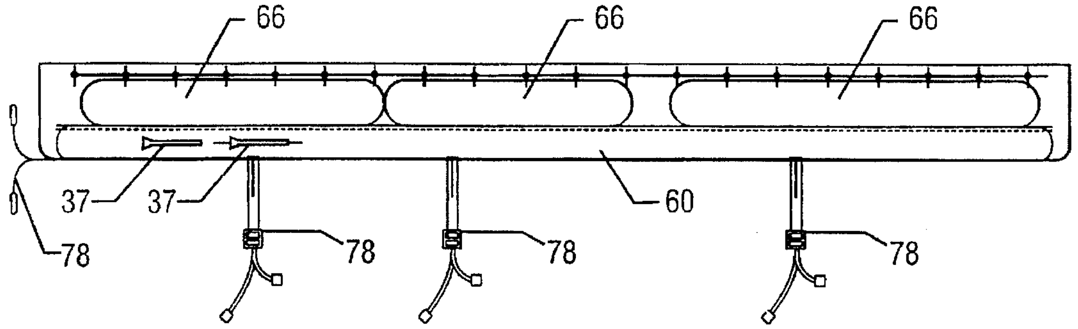
FIG. 4 is an illustration of an exemplary lower cushion level of the mattress assembly shown in FIG. 2, depicted in side view.

As shown in FIGS. 2 and 3, each of the upper chambers 40 of the air bag segments 38 of Zones C and D include a central partition 41 which creates two sections 50 in each chamber 40. Having partitioned upper chambers 40 in cushions 36 in Zones C and D creates a surface which acts like a plurality of separate pillows which tends to reduce the shear on a patient lying on the bed. The air bag segments 38 of cushion 36 in Zones C and D also preferably are each equipped with a series of vent holes 52 in each air segment 38. Each vent hole 52 in the upper surface of segments 38 preferably is approximately 0.02 inch in diameter and is large enough to allow air within the cushion 36 to slowly escape, but small enough to keep any liquids from penetrating through to the pillow interior. Alternatively, this low air loss capability may be accomplished with unsealed portions of the seams in the air segments or other means.

Figure 5:
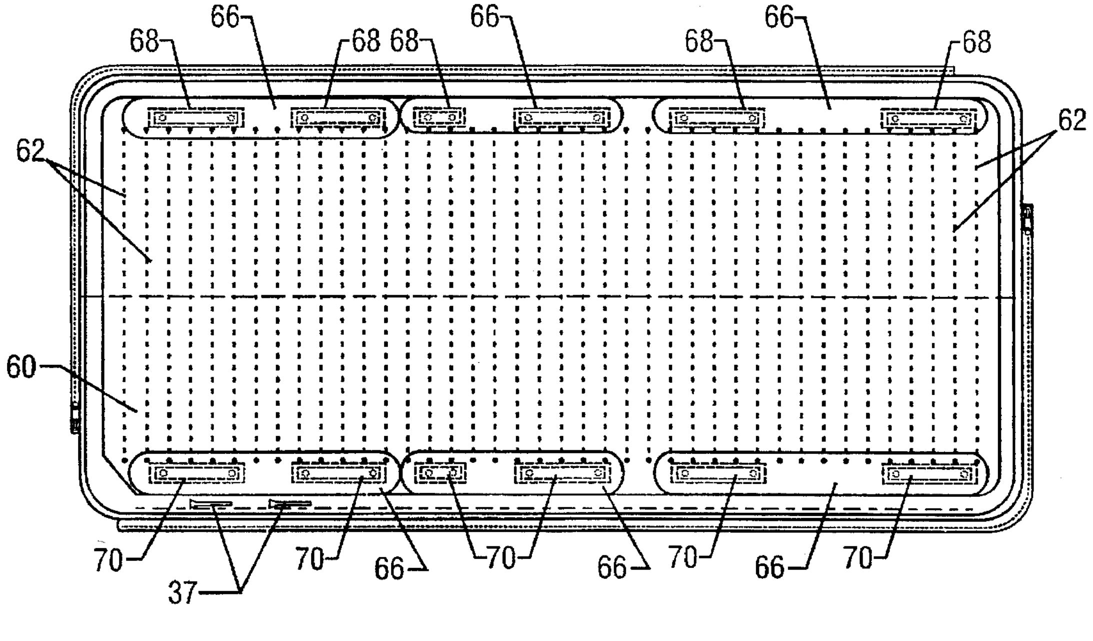
FIG. 5 is an illustration of the exemplary lower cushion level of FIG. 4, depicted in a top view.

The lower cushioning level or layer 58 of the first embodiment of the mattress replacement system of the present invention is shown in FIG. 2. The lower cushioning level 58 comprises a closed cell air bag or substrate 60 extending across the entire length and width of a bedframe. The substrate 60 includes a series of internal baffles 62 (FIG. 5) running perpendicular to the longitudinal axis of the bed along its entire length. As shown in FIG. 5, there preferably are forty internal baffles 62 within the substrate 60, with each of the baffles 62 partially extending across the width of the substrate 60.

Figure 6:
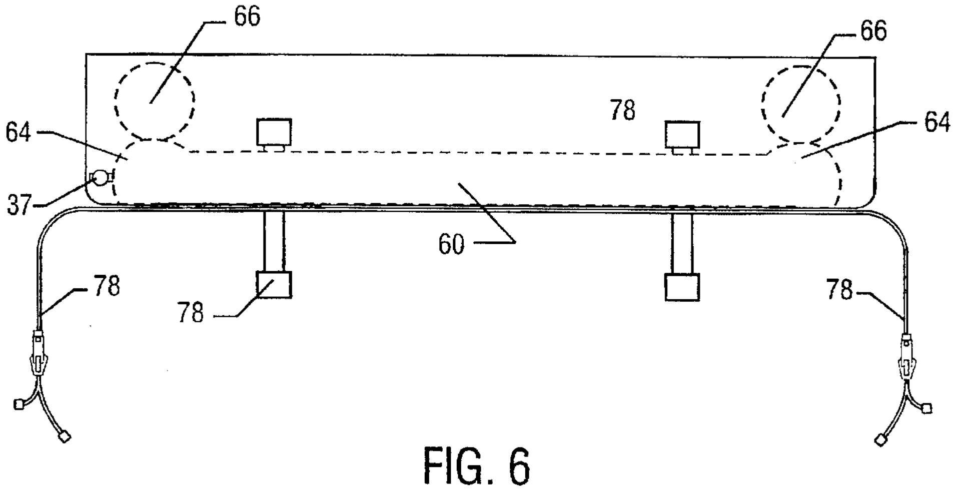
FIG. 6 is an illustration of the exemplary lower cushion level of FIG. 4, depicted in an end view.

As shown in FIG. 6, the longitudinal side edges of the lower cushion air bag 60 may be configured with slightly raised portions or ridges 64 which run along the length of the bed. These raised portions tend to keep the upper cushions 36 centered on the lower cushioning surface. A plurality of bolsters 66 may be formed on the lower cushion 60 along its side edges, with the bolsters 66 preferably being integrally formed with the cushion 60, i.e. welded at locations 68 along their lengths to the portions 64, so that the interiors of the bolsters 66 are in fluid communication with the remainder of bag 60. Preferably, fluid communication between the bolsters 66 and the remainder of bag 60 is achieved through a plurality of generally rectangularly-shaped passageways 70, shown in FIG. 5.

When the upper and lower cushioning levels 22, 58 come together, the bolsters 66 preferably nest within the space below the end portions of the air bag segment upper chambers 40 that extend beyond the air bag segment lower chambers 42 forming a notch portion as shown in FIG. 2. A series of snaps 72 disposed in the ends and sides of the upper and lower cushioning levels 22, 58, respectively, receive side panels 74 placed around the sides of the mattress assembly 10. The side panels 74 snap to and join the ends and sides of the upper and lower cushioning levels 22, 58 enclosing the bolsters 66. Thus, the side panels 74 tend to hold the bolsters 66 in place. See FIG. 2. The bolsters 66 tend to keep the upper cushioning level 22 from shifting with respect to the lower cushioning level 58. At the same time, the bolsters 66 may indirectly provide some side, edge, and/or lateral support for a patient situated on the upper cushioning surface. In addition to the side panels 74, a coverlet 76 also may be placed about the upper and lower cushioning levels 22, 58 to help secure them together as a single unit.

The lower cushioning level 58 may also include a plurality of side release buckles and straps or tie downs 78 about its perimeter. The tie downs 78 are used to secure the mattress assembly 10 to the bed frame 12. Ten tie downs 78 preferably are used for connecting the assembly to the bed frame: three evenly spaced along each side of the bed, and two evenly spaced on each end of the bed.

As shown in FIG. 1, air is supplied to mattress assembly 10 from air supply unit 14 via an air hose assembly system 18, which provides fluid communication between air supply unit 14 and mattress interface connection assembly 90 located on the left foot end of the mattress 10. An air tubing assembly, shown in FIG. 7 and discussed in more detail below, delivers the pressurized air from the interface connection 90 to the individual air cushions of mattress assembly 10.

Figure 14:
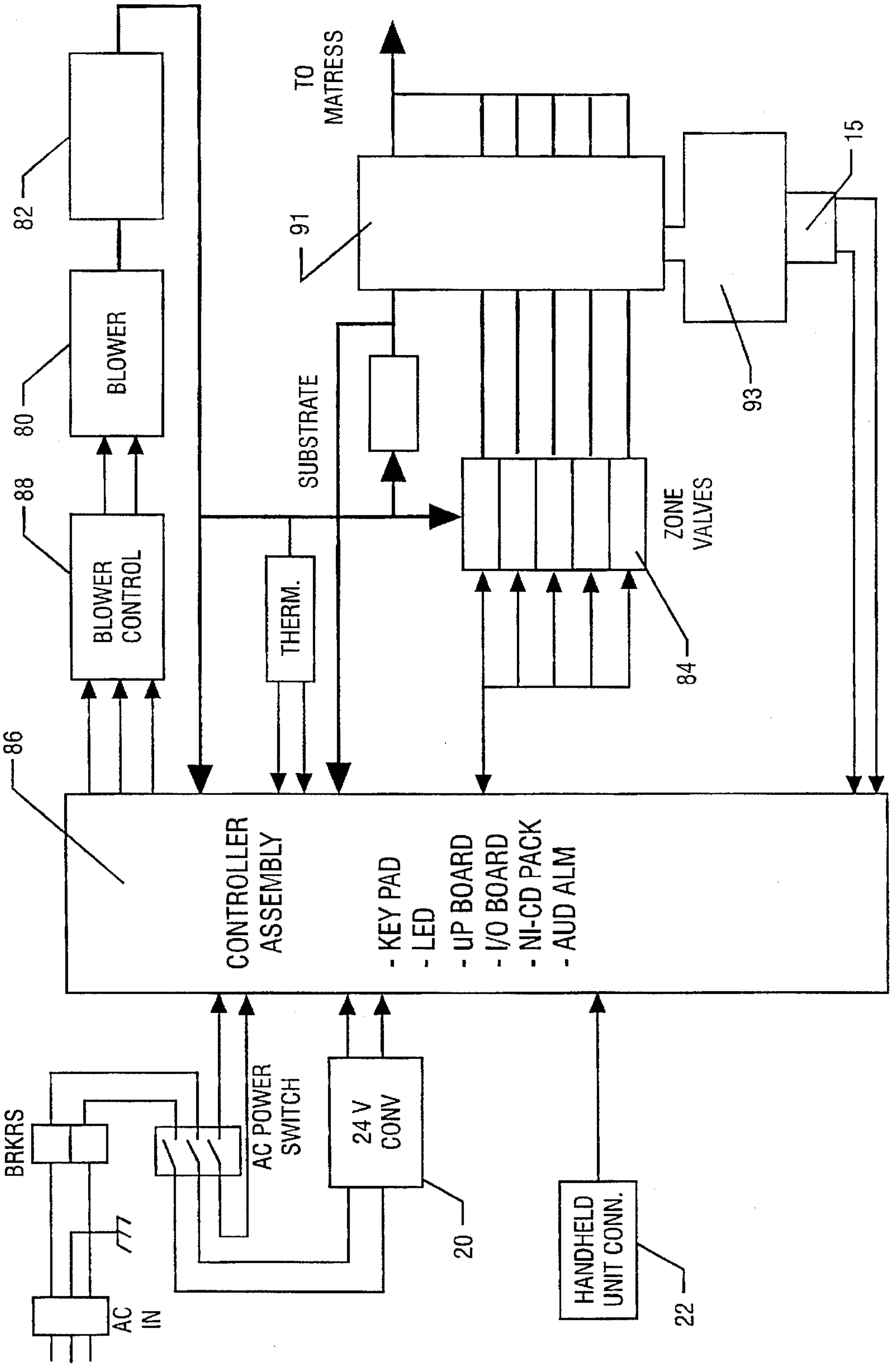
FIG. 14 is a schematic illustration of the structure and operation of an air supply unit of the mattress replacement apparatus of the present invention.

Operation of air supply unit 14 is represented schematically in FIG. 14. A blower 80 takes filtered ambient air from the atmosphere, pressurizes it, and sends it as a stream to a compensating chamber 82. Chamber 82 supplies the pressurized air stream to a plurality of pressure control valves 84. In passing from the chamber 82 through the pressure control valves 84, the single pressurized air stream from the blower 80 is divided into a plurality of independent air streams. The number of pressure control valves 84 equals the number of independent air streams to be directed to the mattress assembly 10, and preferably equals the number of separately inflatable air bags included in the mattress assembly 10.

The pressure of each independent air stream is regulated by the opening and closing of its pressure control valve 84. Preferably, the pressure control valves 84 are proportional valves which automatically adjust in response to a signal received from controller 86, so that their actual Output pressures substantially match desired output pressures. The comparison between actual output pressures and desired output pressures is carried out for each valve by a microprocessor within controller 86. Actual output pressures are measured using pressure transducers located at the proportional valve. The desired output pressures are calculated by the microprocessor based upon the inputs received from the control panel 20.

In addition to monitoring the control panel 20 and controlling the operation of the valves 84, the controller 86 controls the speed of the blower 80. When the microprocessor of the controller unit 86 detects that the actual output pressure at a valve 84 is less than the desired output pressure, the controller 86 signals one of the valves 84 to open so that the actual pressure increases. If the pressure in chamber 82 is insufficient to increase the actual output pressure after the opening of the valve 84, the controller 86 signals the blower control 88 to increase blower speed. Then, as the actual output pressure increases, and the desired output pressure is exceeded, the controller 86 decreases the flow of valve 84 and reduces the speed of the blower 80.

Figure 15:
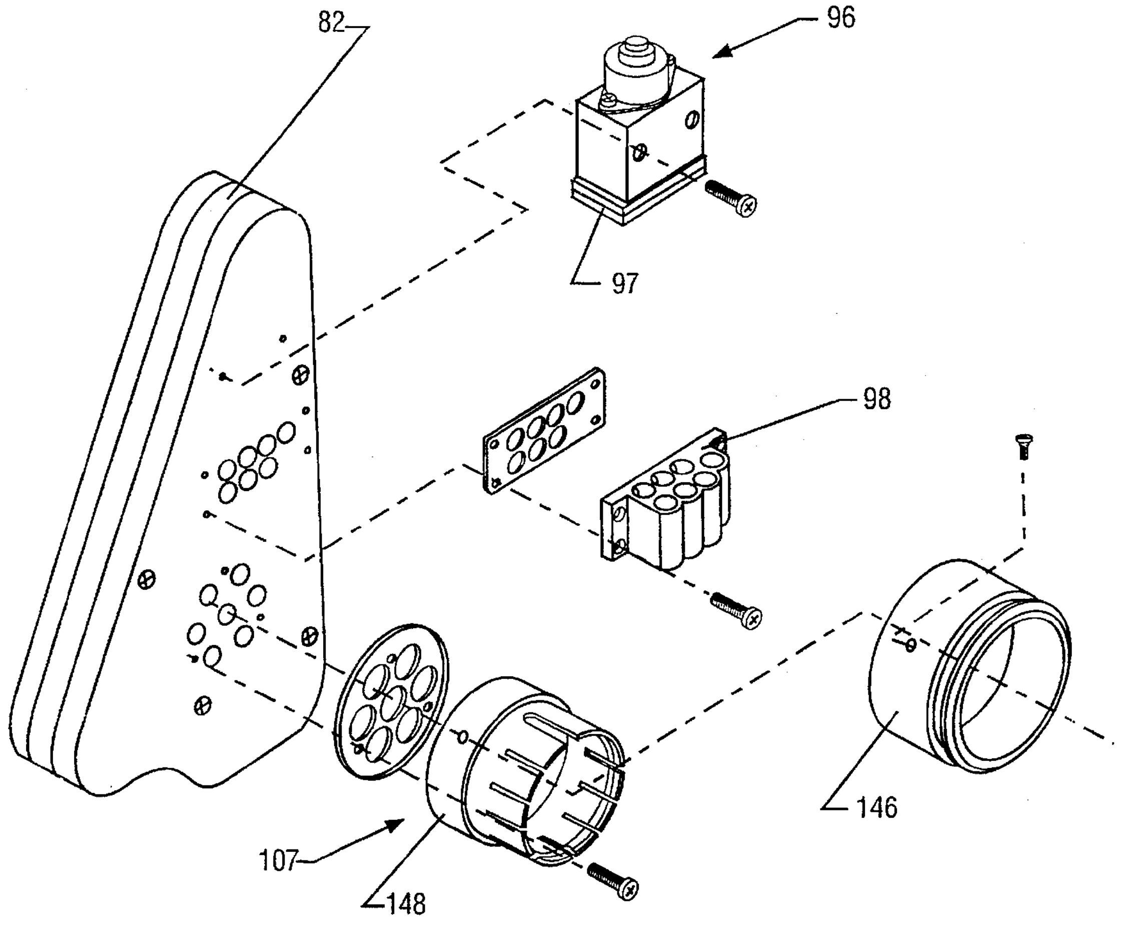
FIG. 15 is an illustration of a CPR dump valve assembly and outlet manifold of the Air Unit in accordance with the present invention.

The independent air streams pass from the proportional valves 84 through an outlet manifold 91, and then into the air supply tubes of the air hose assembly 18. The CPR valve 93 is an electronically controlled valve actuable to vent all of the independent air streams to the atmosphere simultaneously while air flow from the chamber 82 is stopped. To engage the CPR feature a caregiver need only enter a command on the control panel 20 or activates switch 15 located on the outside of unit 14 (FIG. 1). This sends a signal to the controller 86 to open the CPR valve 93 and to stop the flow of air from the chamber 82. As seen in FIGS. 14 and 15, this signal also activates a stepper motor assembly 96 which moves a seal plate 97 from engagement with a CPR unit manifold 98. The plate 97 seals off the CPR vent manifold during normal operation. This vent manifold 98 allows each of the passages of the chamber 82 to be rapidly vented directly into the atmosphere when the plate 97 is moved from contact with the vent manifold 98. Alternatively, the present invention also provides that a manual CPR condition may be accomplished by disconnecting the hose assembly 18 from the air unit 14, allowing air to escape from the mattress assembly. The net result of either manner of operation is the rapid deflation under the weight of the patient of all of the air chambers of the mattress assembly.

Figure 9:
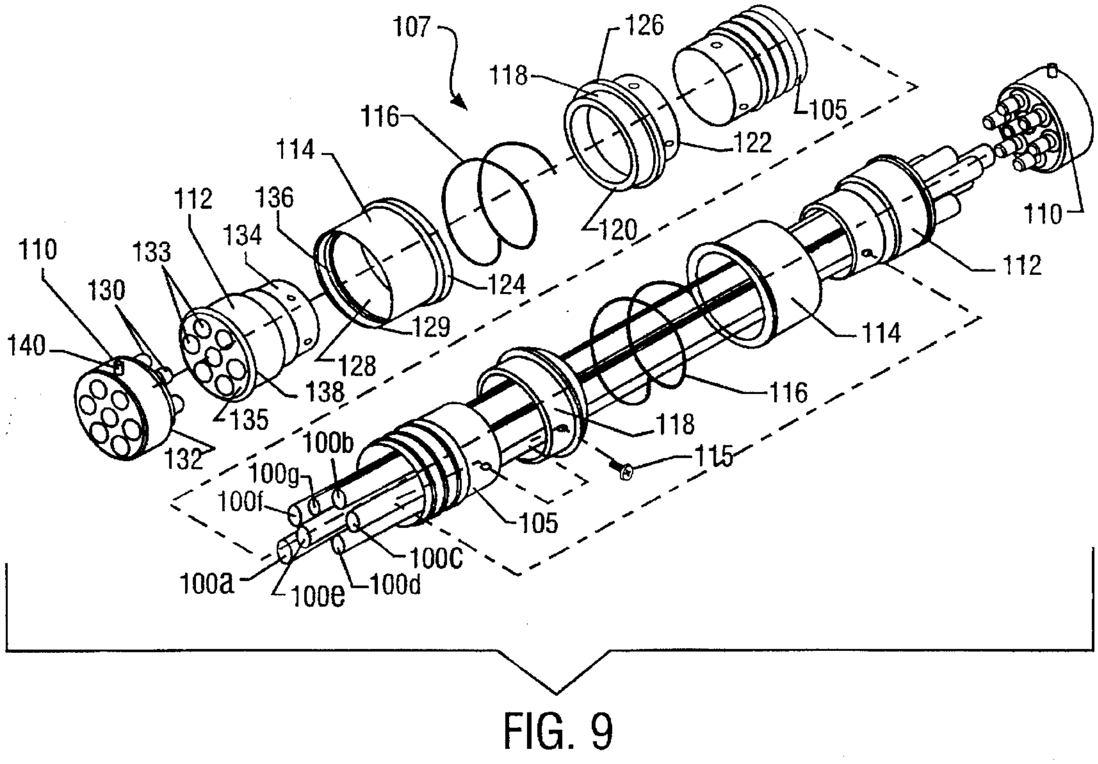
FIG. 9 is an illustration of an exemplary air hose assembly in accordance with the present invention, shown in an exploded view, for connecting an air supply unit to the exemplary air tubing assembly shown in FIG. 7.

The air hose assembly 18 of FIG. 1 is shown in greater detail in FIG. 9. The hose assembly 18 comprises a plurality of independent air stream supply tubes 100*a–g* bundled together and nested within an outer tube 105. The air hose assembly 18 preferably has sufficient length so that during use the air supply unit 14 may be positioned either hanging from the footboard 16 of the bed or on the floor near the bed. Typically, it may be about 4 feet long. Both ends of the air hose assembly 18 are adapted with an interface coupling 107 (FIG. 1) so that the air hose assembly 18 may be connected to deliver air from the air supply unit 14 to the mattress assembly 10. Preferably, the interface couplings 107 on each end of the air hose assembly are identical, so that either end of the air supply hose can be attached to either the air supply unit 14 or the interface connection assembly 90 of the mattress assembly 10.

The interface coupling assembly 107 includes a fitting adapter assembly 110, a hose connector 112, a release ring 114, a coupling spring 116, and a connector ring 118. Assembly 110, connector 112 and ring 118 form a coupling body upon which ring 114 and spring 116 are mounted. As shown in FIG. 9, the connector ring 118 is a generally tubular, collar-like member having two ends, the first end 122 fixedly attached by screws or other suitable fastening means to an end of outer tube 105, and a second end, including a front face 120 adapted to receive the rearward end of coupling spring 116. The inside diameter of the rearward end 122 of connector ring 118 is slightly larger than the outside diameter of the end of outer tube 105, so that the outer tube 105 fits within the rear end 122 of the connector ring 118. The outer diameter of the opposed end of ring 118 having the front face 120 preferably is slightly smaller than the inside diameter of end 124 of release ring 114, so that the rear end 124 of the release ring 114 may slide over the opposed end of the connector ring 118 to the point where end 124 butts up against a raised stop 126 on the exterior surface of ring 118. The release ring 114 includes an inside portion 128 of restricted inside diameter which includes a rear face (not shown) of end 124 is adapted to receive the forward end of the coupling spring 116.

Each of the individual air tubes 100*a–g* disposed within the outer tube 105 passes through the central openings of connector ring 118, coupling spring 116, and release ring 114 to within hose connector 112 to attach at one end to one of a plurality of male fittings 130 projecting rearward from fitting adapter assembly 110 and through the openings 133 in faceplate 135 of hose connector 112. The end 134 of the hose connector 112 opposed from faceplate 135 comprises a reduced diameter section which is disposed through the central openings of release ring 114, coupling spring 116, connector ring 118, and within the end of outer tube 105. Screws 115 or other fastening means used to join outer tube 105 and connector ring 118 also preferably secure end 134 of hose connector 112 when it is disposed within the outer tube 105.

The faceplate 135 of the hose connector 112 preferably has substantially the same outside diameter as the fitting adapter assembly 110, so that when assembled, at least the forward end 129 of release ring 114 is free to slide over the interface or groove formed between the fitting adapter assembly 110 and the hose connector 112. Release ring 114 will tend to be retained in a forward position over the interface or groove between fitting adapter assembly 110 and hose connector 112 in response to the action of coupling spring 116, which is in a compressed state when rear end 134 of hose connector 112 is properly disposed and secured within outer tube 105. The forward progress of the release ring 114 stops, however, when the forward face 136 of inside portion 128 contacts a portion of hose connector 112.

Preferably, the fitting adapter assembly 110 and hose connector 112 are secured together by screws or other suitable fastening means so that rotation of the parts with respect to one another is avoided. An outside groove 132 is formed at the interface between fitting adapter assembly 110 and hose connector 112 when those pieces are brought together. Fitting adapter assembly 110 also preferably includes on its outside surface a "post" or other key mechanism 140. To ensure that each supply tube 100 is connected to the proper distribution tube 154, the key 140 is configured to fit within slots 142, 143 of interface flange 146 and fitting body assembly 148 which form part of the interface connection assembly 90 (FIG. 8). A gasket may be placed between the connector connection 112 and assembly 110 and the air supply hose assembly 18 (see FIG. 7).

The interface coupling assembly 107 and the interface connection assembly 90 work with each other to form a quick disconnect assembly as will now be described. Fitting adapter assembly 110, hose connector 112, release ring 114, and spring 116 of the coupling 107 cooperate with interface flange 146 and fitting body assembly 148 of connector 90 (FIG. 7) to comprise a locking mechanism for the air mattress system. The inside diameter of end 145 of interface flange 146 is slightly larger than the outside diameter of release ring 114. The inside diameter of end 129 of release ring 114 is slightly larger than the outside diameter of end 141 of fitting body assembly 148. The end 141 of fitting body assembly 148 includes, in addition to key slot 143, a plurality of slots 137 which define resilient tabs 139. Each of tabs 139 includes on its inner surface a raised edge or ridge 180 (see FIG. 8). The inside diameter of end 141 of fitting body assembly 148 generally is slightly larger than the outside diameter of fitting adapter assembly 110; however, due to the ridges 180 on the inside surface of each tab 139 extending to an effective inside diameter smaller than the outside diameter of fitting adapter assembly 110, for the end 141 of fitting body assembly 148 to slide over the outside surface of fitting adapter assembly 110, the tabs 139 must flex radially outward. Thus, when end 141 slides onto fitting adapter assembly 110 (with key 140 aligned to pass within slot 143 between fitting adapt interface between fitting adapter assembly 110 and hose connector 112 becomes a seat for the ridges 180 such that ridges 180 mate with groove 132, at which point the tabs 139 return to their inner, unflexed position. With tabs 139 unflexed, and the ridges 180 disposed within groove 132, release ring 114 is able to slide forward toward fitting adapter assembly 110 fully in response to the action of spring 116 into a clamping space formed between the outside surface of end 141 of fitting body assembly 148 and the inside surface of end 145 of interface flange 146. In this position, release ring 114 prevents tabs 139 from flexing outward, so that the ridges 180 mated within groove 132 are unable to move outwardly and exit the groove 132 because the tabs 139 cannot flex outwardly, preventing the connector 90 and coupling 107 from being pulled apart. Thus, the hose assembly 18 is releasably connected and "locked" in place. To decouple the hose assembly, the release ring 114 is manually slid back out of the clamping space, allowing tabs 139 to flex outwardly to permit coupling 107 to be pulled from the interface connector 90 or air supply unit 14.

Turning to FIG. 8 and the fitting body assembly 148, fittings 185 are seated with spacers 187 within openings 188 in fitting body assembly 148. Fittings 185 preferably contain check valves which prevent air from escaping through the connector 90 and from the mattress assembly when the hose assembly 18 is decoupled from connector 90. Preventing the loss of air from the mattress would be desirable, for example, in cases where it is necessary to turn off the air supply unit 14 to transfer the patient from one location to another. Such a feature allows the termination of electrical power to the system yet allows at least a portion of the mattress system to remain inflated, thereby decreasing the need for a battery power system in the air supply unit. Also, as shown in FIG. 7, the interface coupling 90 includes a body 92 with inlet port 94 and an outlet port 96 having male fittings 150 extending outwardly which also may be check valves to prevent the loss of air under such circumstances.

Figure 7:
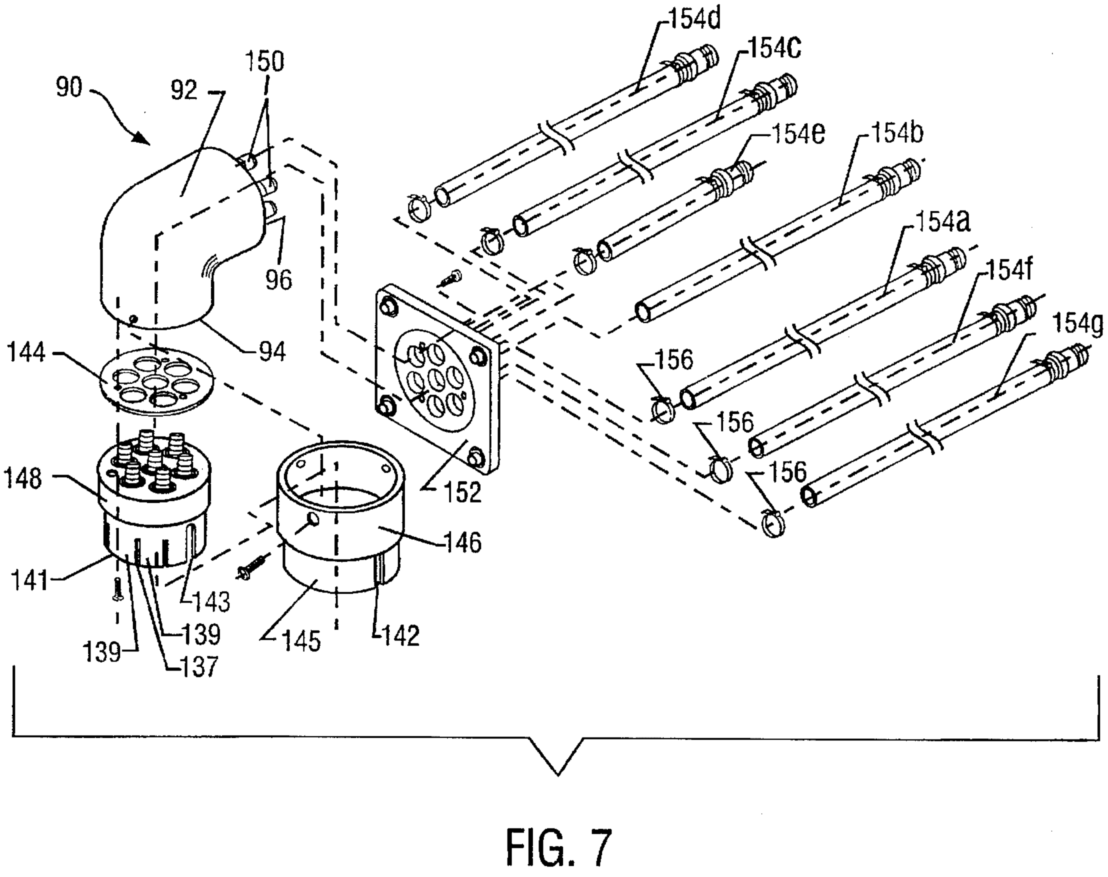
FIG. 7 is an illustration of an exemplary interface connection assembly, in accordance with the present invention, shown in an exploded view, for connecting an air hose assembly to the mattress assembly shown in FIG. 2.
Figure 8:
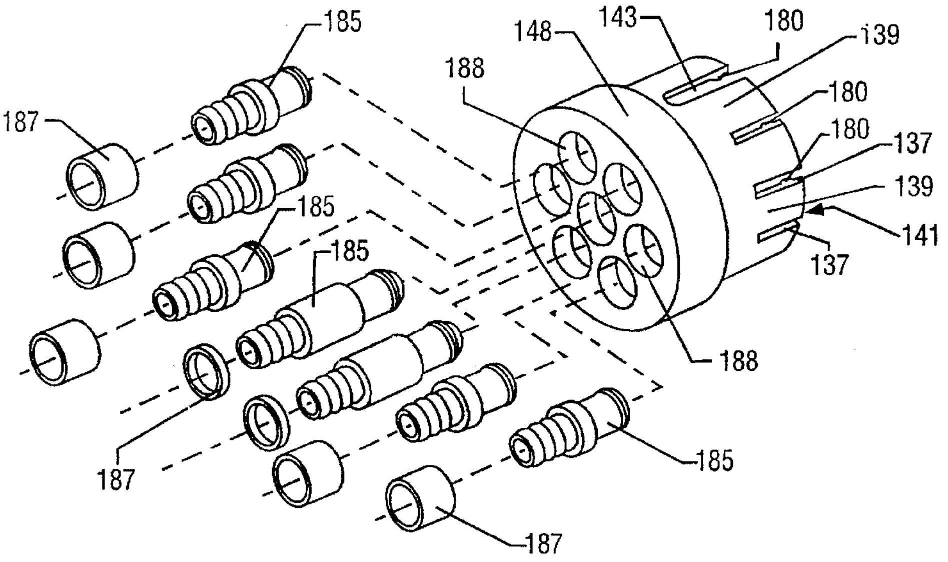
FIG. 8 is an illustration of an exemplary fitting body assembly, in accordance with the present invention, shown in an exploded view, for receiving an end of the air hose assembly shown in FIG. 9.

In FIG. 7, fittings 150 may pass through the mattress interface plate 152 and connect to one end of the individual mattress air supply tubes 154*a–g*. The air supply tubes 154 *a–g* are secured in place using tie-wraps 156 (as shown in FIG. 7) or other suitable connecting means. Each of the mattress air supply tubes 154*a–g* provides air to one of the inflatable chambers of the cushions which make up mattress assembly. The ends of individual air supply tubes 154 distal the firings 150 attach to the inflatable chamber connectors 37 for each chamber.

A second preferred embodiment of the mattress replacement system of the present invention generally comprises a two level mattress system including a combination of air chamber assemblies actuable for longitudinally rotating or turning a patient from side to side as desired. In the second preferred embodiment air again is supplied to the separate air chambers of the mattress by an air supply unit 14 via an air hose assembly 18 and an interface connection assembly 90. The preferred interface connection assembly 90 and air supply tubes 280, 285, 290, 295, 300 of the second preferred embodiment of the present invention is shown in greater detail in FIG. 13.

Figure 10:
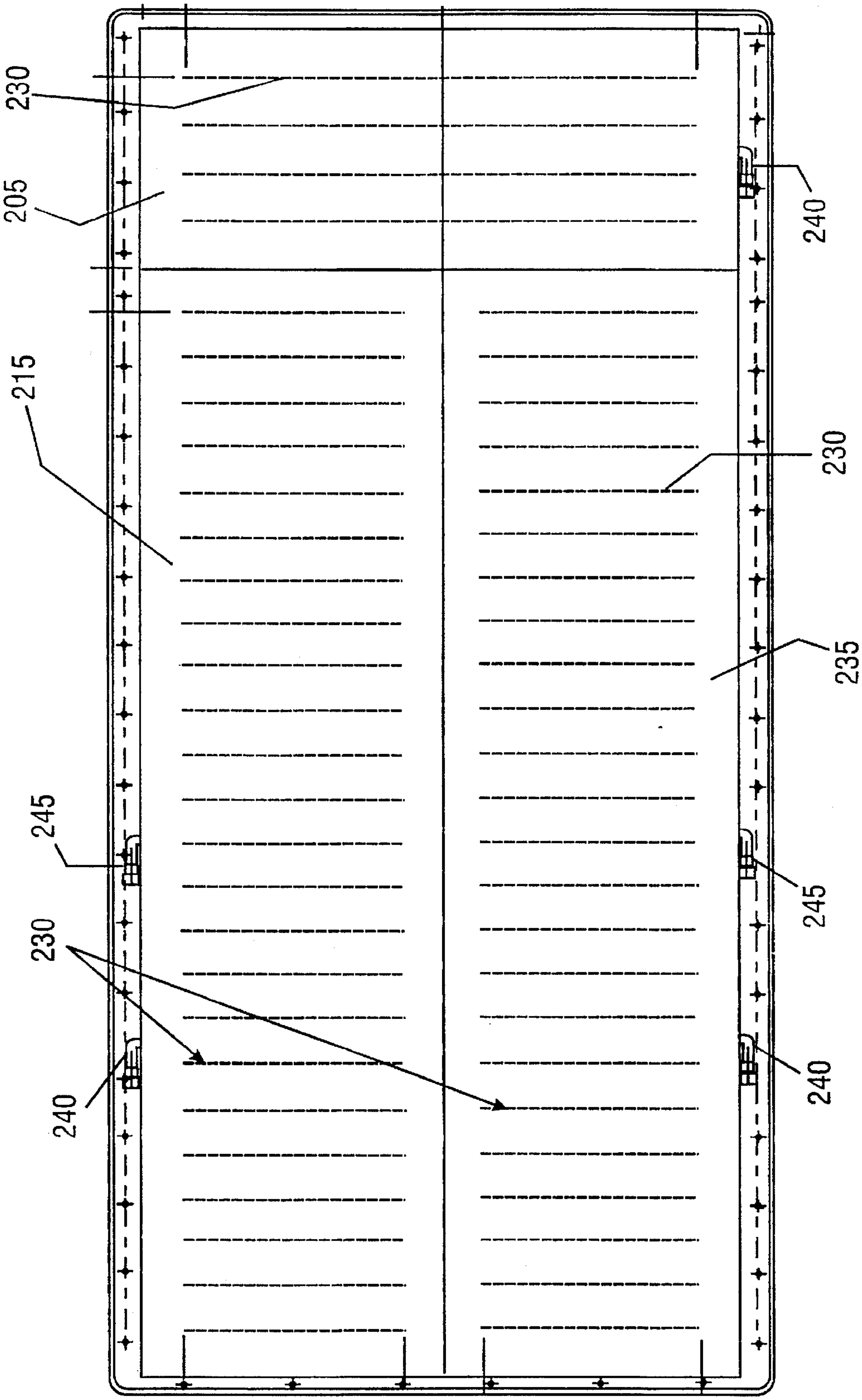
FIG. 10 is an illustration of an exemplary lower cushion level of an exemplary dual mode embodiment of the present invention, i.e., an embodiment including both static and turning modes, depicted in a top view.
Figure 11:
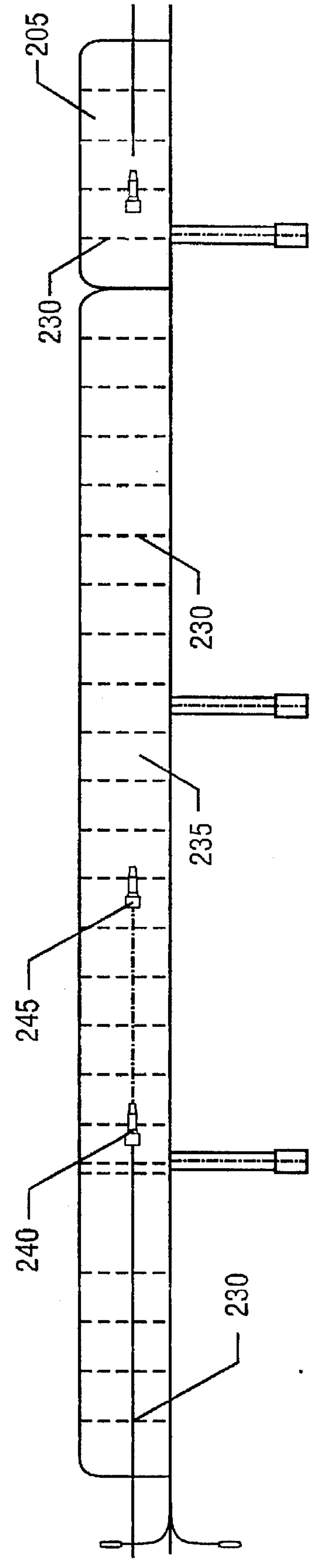
FIG. 11 is an illustration of the exemplary lower cushion level shown in FIG. 10, depicted in a side view.

The lower level air chamber assembly or substrate of the second preferred embodiment is shown in FIGS. 10–11. The substrate comprises a first lower level cushion or air sack 205, aligned beneath the patient's head region and second and third lower level cushions or air sacks 215, 235, respectively (FIG. 10). As noted above, each lower level cushion 205, 215, 235 comprises a single air chamber which includes a plurality of internal webs 230 running across at least a portion of each air sack perpendicular to the longitudinal axis of the bed. Each lower level air chamber further includes at least one body coupling 240 comprising the inlet/outlet port for the air which inflates each chamber. Preferably, both the second and third lower level air chambers each have two body couplings 240,245 to permit more rapid inflation and deflation of those air chambers.

Figure 12A:
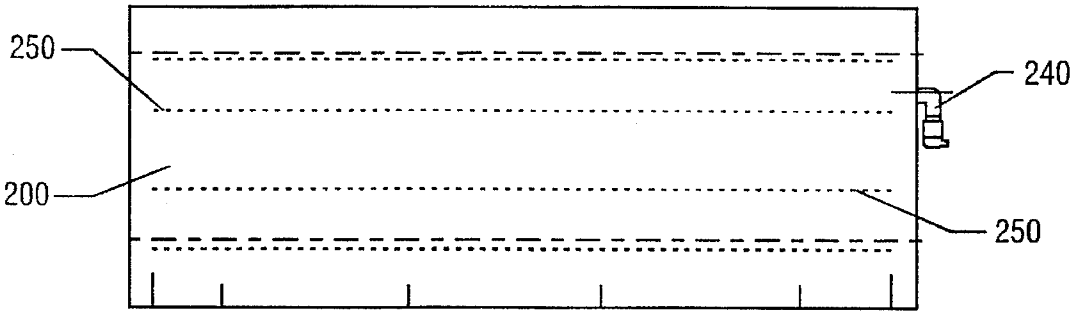
FIGS. 12*a*–12*c* are illustrations of cushions of an exemplary upper cushion level of a dual mode embodiment of the present invention, depicted in a top view.
Figure 12B:
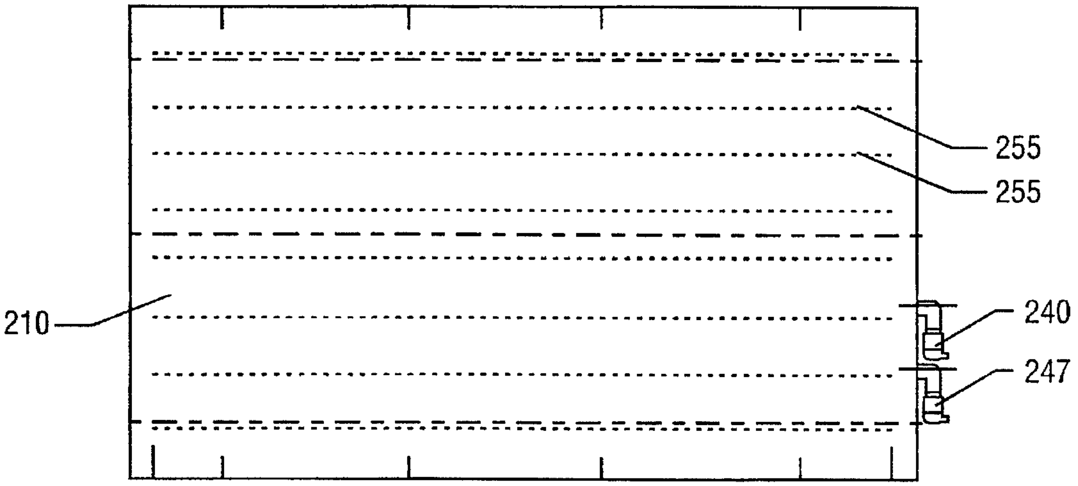
Figure 12C:
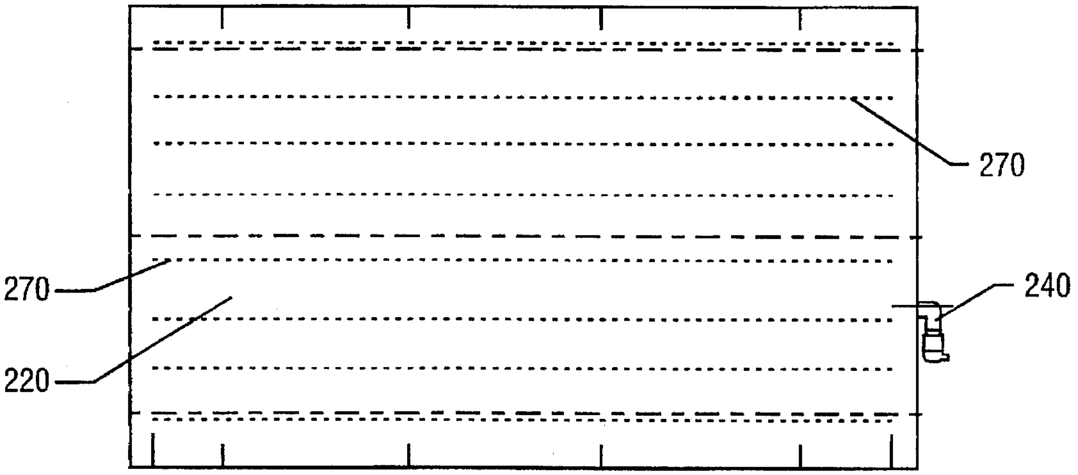

The upper level air chambers are shown in greater detail in FIGS. 12*a–c*. FIG. 12*a* shows the head section cushion 200 corresponding to Zone 1 of the second preferred embodiment. The head section cushion is a single rectangularly shaped air bag including a plurality of internal webs 250 extending partially across the width of the bag, perpendicular to its longitudinal axis. The head section cushion 200 also includes a body coupling 240 adapted for receiving connector 260 of sleep surface air tube 225 (see FIG. 13).

Figure 13:
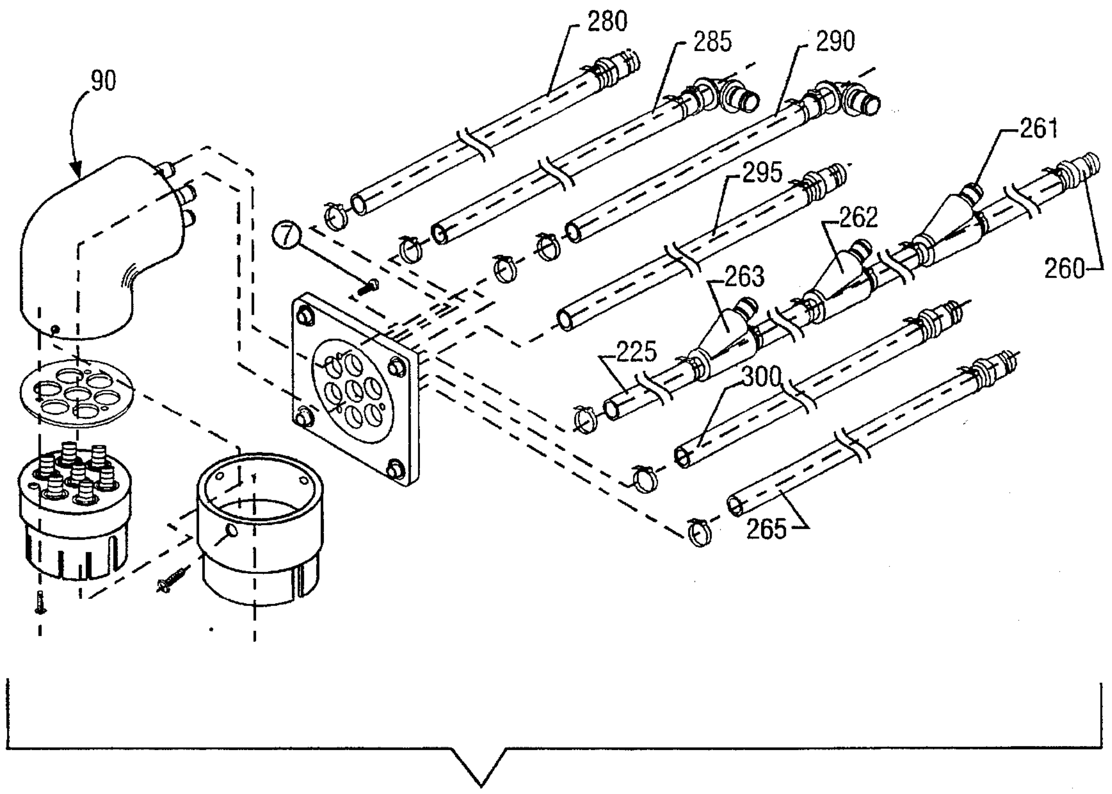
FIG. 13 is an illustration of an exemplary interface connection assembly, in accordance with the present invention, for connecting an air hose assembly to a mattress assembly of a dual mode embodiment of the present invention.

FIG. 12*b* shows the chest section cushion 210 corresponding to Zone 2 of the second preferred mattress replacement system. The chest section cushion 210 is a single rectangularly shaped air bag including a plurality of internal webs 255 extending partially across the width of the bag, perpendicular to its longitudinal axis. The chest section cushion 210 further includes at least one body coupling 240 adapted to receive connector 261 of sleep surface air tube 225 (FIG. 13). Preferably, the chest section cushion 210 also includes a body coupling 247 adapted to receive the connector for vent tube 265 (FIG. 13). Vent tube 265 comprises a portion of an exhaust airway which allows more rapid deflation of the chest cushion 210 in cases of patient cardiac arrest. The exhaust airway extends from the chest section cushion 210 through vent tube 265, through the interface connection 90, through air hose assembly 18, to the CPR valve 93. In an alternative embodiment, the exhaust airway may be extended to a separate exit valve of the air chamber 82, to allow for more rapid inflation of the mattress.

FIG. 12*c* shows the cushion 220 used for both the seat and foot zones of the upper level air chamber assembly corresponding to Zones 3 and 4, respectively, of the second preferred mattress replacement system. Again, each air chamber includes a plurality of internal webs 270 extending partially across the width of the bag, perpendicular to its longitudinal axis, and a body coupling 240. The body couplings 240 in the seat and foot cushions are adapted to receive connectors 262 and 263, respectively, of sleep surface air tube 225 (FIG. 13).

The connector 90 and related tubes of the second preferred embodiment of the present invention is shown in FIG. 13. As mentioned above, air supply tube 225 supplies air to the upper cushions 200, 210, 220, and tube 265 is a vent tube which allows for more rapid deflation of the chest cushion 210. Air supply tubes 280,300 provide air to the third lower level air sack 235, and air supply tubes 285,290 provide air to the second lower level air sack 215. Air supply tube 295 provides air to the first lower level air sack 205.

As can now be understood, by using the controller 86 to operate valves 84, cushions 215, 235 can be alternatively inflated and deflated such that alternative sides of the patient may be lowered thereby providing a rotating or turning motion to the patient's body as it rests upon the support surface of the mattress.

Although the preferred embodiment of this invention has been described hereinabove in some detail, it should be appreciated that a variety of embodiments will be readily available to persons utilizing the invention for a specific end use. Again, the description of the apparatus and method of this invention is not intended to be limiting on this invention, but is merely illustrative of the preferred embodiment of this invention. Other apparatus and methods which incorporate modifications or changes to that which has been described herein are equally included within this application. Additional objects, features and advantages of the present invention will become apparent by referring to the above description of the invention in connection with the accompanying drawings.

What is claimed is:

1. A patient air mattress replacement system for use with a support bed frame comprising:

an air source;

an air mattress replacement assembly for mounting on the bed frame and having a first air support layer and a second air support layer;

a controller assembly connected to the air source for selectively directing air to the first support layer and the second support layer;

a hose assembly system for connection to the air source for communicating air from the air source to the mattress assembly, the hose assembly having a first layer supply tube for providing air to the first layer and a second layer supply tube for providing air to the second layer;

an interface connection assembly connecting the mattress assembly to the hose assembly, the connection assembly communicating air from the first layer support tube to the first support layer and air from the second layer support tube to the second support layer, said connection assembly further having a first valve fitting for preventing escape of air through the interface connection assembly from the first air support layer when the hose assembly is disconnected from the interface connection assembly.

2. The patient air mattress replacement system of claim 1 wherein the interface connection assembly further includes a second valve fitting for preventing escape of air through the interface connector assembly from the second air support layer when the hose assembly is disconnected from the interface connection assembly.

3. The mattress system of claim 1 wherein the first air support layer includes at least two internal chambers, the hose assembly includes a third supply tube for providing air to one of the internal chambers of the first air support layer and the interface connection assembly communicating air from the third supply tube to the one of the internal chambers of the first air support layer.

4. The mattress system of claim 3 wherein the interface connection assembly includes a valve fitting for each supply tube of the hose assembly for preventing escape of air from the mattress assembly through the connection assembly when the hose assembly is disconnected from the interface connection assembly.

5. The patient air mattress replacement system of claim 1 wherein the first air support layer comprises a plurality of section cushions which provide a patient support surface;

the second air support layer underlying the first support layer and comprising a first lower level cushion aligned beneath the patient's head region and maintained at a substantially constant pressure during use;

a first elongated cushion, a second elongated cushion, said first and second elongated cushions positioned side-by-side extending along at least a portion of the longitudinal axis of the bed and aligned beneath the sides of the patient, whereby the patient may be turned toward one side of the bed and then the other by controllably inflating and deflating the first and second elongated cushions.

6. The mattress system of claim 1 wherein the first air support layer provides a patient support surface having a plurality of vent holes.

7. The mattress system of claim 1 wherein the first support layer comprises a plurality of section cushions which provide a patient support surface; and the second support layer includes side supports aligned along each side edge of the second support layer.

8. A quick disconnect assembly for use with a patient air mattress replacement having a plurality of independently inflatable air chambers, said disconnect assembly connected between the air mattress and an air source, comprising, a hose assembly system having an interface coupling assembly at one end of said hose system, a plurality of air supply tubes connected to the interface coupling assembly for providing air for the air chambers of the air mattress;

an interface connection assembly connected to the air mattress and releasably connected to the interface coupling assembly, said connection assembly having an interface connection housing, having an inlet port;

a plurality of tube fittings mounted within the housing;

a plurality of distribution tubes, each tube having its first end connected to one of the internal chambers of the air mattress and its second end connected to the tube fittings within the housing;

a plurality of resilient tabs mounted to the housing and extending circumferentially around the tube fittings and into the inlet port of the housing such that a clamping space is formed between the housing and the outer surfaces of the tabs, each tab having an internal raised ridge on its inner surface;

the interface coupling assembly further having a coupling body, the body having a circumferential groove positioned so that the raised ridges of the resilient tabs mate with the groove when one end of the coupling body is partially inserted into the inlet port of the interface connection housing; and a spring biased release ring mounted to the coupling body adjacent the groove, the ring being resiliently positionable along the coupling body so that when the raised ridges of the resilient tabs are mated with the groove of the coupling body, the release ring may be positioned in the clapping space such that the release ring maintains the raised ridges of the resilient tabs in the groove of the coupling body whereby the coupling body is releasably connected to the interface connection body and air from the air supply tubes is directed through the tube fittings to the distribution tubes.

9. The disconnect assembly of claim 8 wherein at least a portion of the tube fittings include a valve assembly for preventing escape of air through the interface connection assembly from the air mattress when the hose assembly system is disconnected from the interface connection assembly.

10. The disconnect assembly of claim 8 wherein the hose assembly system includes a second interface coupling assembly attached to the remaining end of the hose system.

11. The disconnect assembly of claim 8 wherein the hose assembly system further includes a outer tube surrounding the air supply tubes and having one end connected to the interface coupling assembly.

12. The disconnect assembly of claim 8 wherein the hose assembly system further includes a means for properly aligning the interface coupling assembly and the interface connection assembly whereby each supply tube provides air to a preselected distribution tube.

* * * * *

UNITED STATES PATENT AND TRADEMARK OFFICE
CERTIFICATE OF CORRECTION

PATENT NO. : 5,647,079

DATED : July 15, 1997

INVENTOR(S) : Reza Hakamiun et al.

It is certified that error appears in the above-identified patent and that said Letters Patent is hereby corrected as shown below:

In claim 8, column 15, line 27, delete "clapping" and insert -- clamping -- therefor.

In claim 10, column 16, line 18, delete "a" and insert -- an -- therefor.

Signed and Sealed this

Twenty-fifth Day of November, 1997

Attest:

BRUCE LEHMAN

*Attesting Officer* *Commissioner of Patents and Trademarks*